Patented Feb. 28, 1939

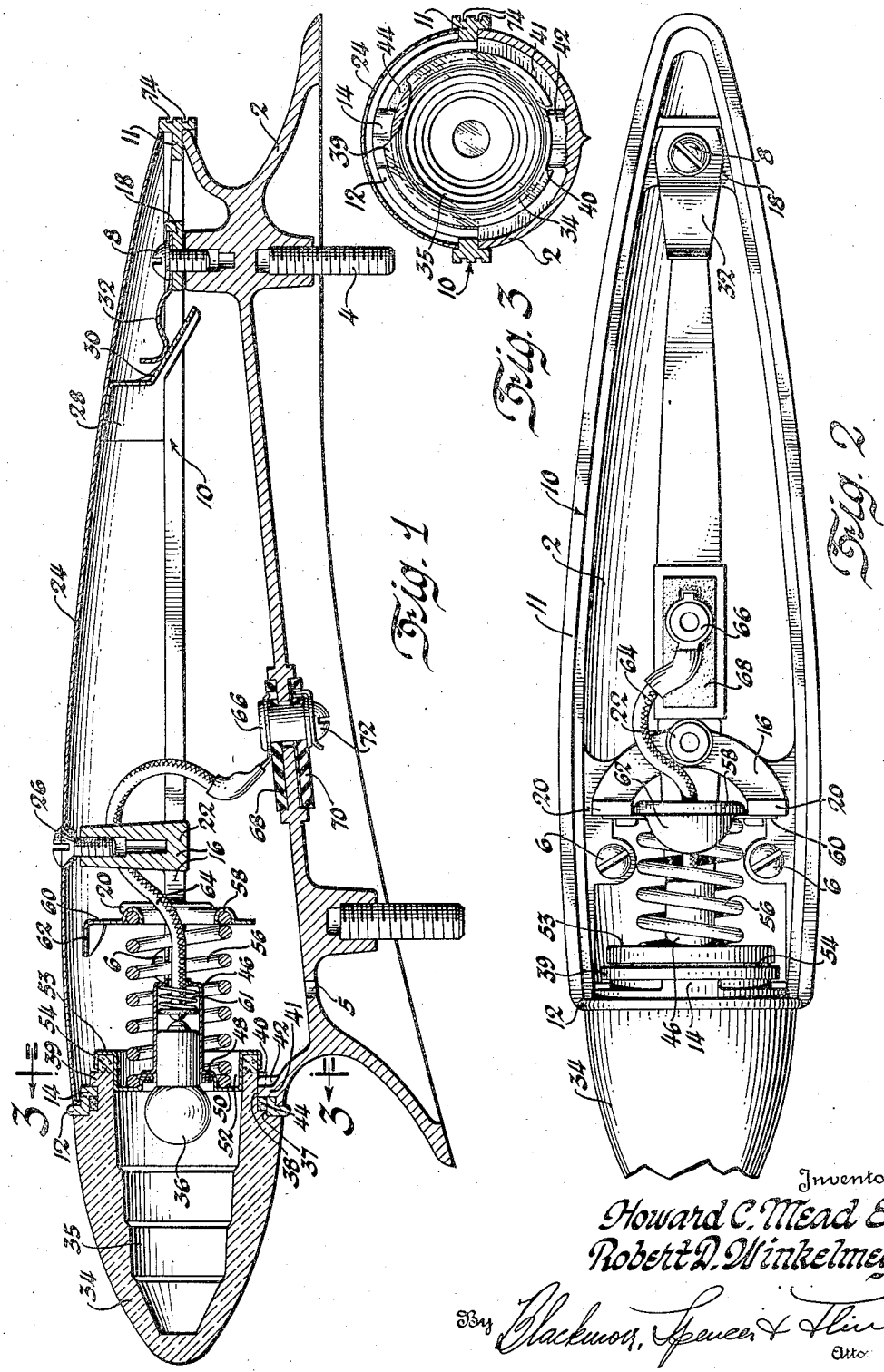

2,148,870

UNITED STATES PATENT OFFICE 2,148,870

FENDER LAMP

Howard C. Mead and Robert D. Winkelmeyer, Anderson, Ind., assignors to General Motors Corporation, Detroit, Mich., a corporation of Delaware Application April 3, 1937, Serial No. 134,745

5 Claims. (Cl. 240—8.1)

This invention relates generally to illuminating means and more particularly to lamps used on vehicles such as automobiles and the like.

The primary object of this invention is to provide a lamp, as for example a vehicle fender lamp, of pleasing appearance and of simple construction that may be readily manufactured and assembled.

Another object of this invention is to provide a fender lamp of simplified construction for use on vehicles and which may be used for signalling purposes.

It is also an object of this invention to provide a fender lamp of pleasing appearance, yet one of simplified construction in which the several parts are firmly secured together in an expeditious manner.

Still another object of the invention is to provide a lamp for vehicles in which the several parts may be readily removed and replaced.

Other objects and advantages of this invention reside in the combination and arrangement of parts as will become more apparent as the description proceeds. Reference is herein made to the drawing forming a portion of this specification and illustrating one embodiment of this invention.

In the drawing:

Figure 1 is a longitudinal sectional view showing a vehicle fender lamp of this invention.

Figure 2 is a plan view of the fender lamp of Figure 1 with the cover removed.

Figure 3 is a sectional view substantially on line 3—3 in Figure 1 with the bulb and support therefor removed.

In the drawing, 2 is a base member adapted to be secured by means of screws 4 to a vehicle fender. The base may be formed by casting, preferably by a die casting operation, or in other suitable manner. As shown in the drawing, the base is of an elongated form and is shaped to conform to the curvature of the fender. A suitable drain opening 5 is formed therein. Secured to the base by means of screws 6 and 8 is a frame 10 having a portion 11 T-shaped in cross section generally shaped to conform to the top of the base. The front of the frame has an annular portion 12 of angular cross section. At the upper part of the annular portion, as viewed in Figure 1, is a lug 14. The frame has cross pieces 16 and 18 adjacent the front and rear of the frame. Two similar upright members 20 rise from the cross piece 16, while at substantially the midpoint thereof is a post 22.

An elongated cover plate 24 of curved contour is secured to the post 22 by means of the screw 26. Preferably the cover is formed of a sheet metal stamping. Adjacent the rear of the cover plate and secured thereto by means of a welding or brazing operation or the equivalent, is a member 28 having an inclined portion 30. The latter contacts a curved leaf spring 32 secured to the frame by means of the screw 8. The cover plate contacts the top side of the leg of the T, while the top of the base contacts the bottom side. The head of the T frame conceals the top of the base and the bottom of the cover plate as indicated in Figures 1 and 3.

At the front of the lamp is a generally conical or bullet-shaped lens 34 of glass or other material through which light may be transmitted. The central portion of the lens may be hollow as indicated at 35. Preferably the inner surface of the lens is frosted. Within the lens is an incandescent light bulb 36. The lens has a stepped end portion 37 which contacts the annular portion of the frame, while a circular sleeve portion 38 fits within the annular portion of the frame. A flange 39 formed on the sleeve at the open end of the lens has a slot 40 therein. A semi-circular flange 41 on the base contacts the sleeve portion of the lens and assists the lug 14 in securing the lens in position. A lug portion 42 formed integral with the flange 41 is adapted to fit within the slot 40 in the flange of the lens and prevent the latter from rotating with respect thereto when the several parts are in the positions shown in Figures 1 and 3. In order to remove and replace the lens the cover plate 24 is first removed. Then the screws 6 and 8 are removed and the frame and lens lifted from the base. The lens is then rotated 180° until the slot 40 is in alignment with the lug 14, whereupon the lens may be withdrawn from the annular portion of the frame. A new lens may then be placed in the assembled position by reversing the order of steps outlined above. A gasket 44 formed of rubber or other suitable resilient material surrounds the open end of the lens and forms a seal between the lens, the flange on the base and the annular portion of the frame.

The bulb is supported by means of a socket 46 joined by means of a seam 48 with a member 50 having a portion 52 of substantially circular contour which contacts the inside of the open end of the lens, as indicated in Figure 1, and centers the bulb with respect thereto. The member 50 has a circular portion 53 of channel-shaped cross section within which is a gasket 54 formed of any suitable gasket material; for example cork. The gasket 54 contacts the end of the lens and is held resiliently in contact therewith by means of a coil spring 56. One end of the spring contacts the member 50 and the other engages a groove 58 formed in a washer-like member 60 having a tab portion 62. The member 60 is biased by the coil spring into contact with the uprights 20 formed on the frame. Opposite sides of the member 60 rest on a portion of each side of the frame. Within the socket is a smaller coil spring 61 which resiliently biases one end of a lead 64 into contact with the bulb. The other end of the lead is fixed to a terminal 66 insulated from the base by means of strips 68 and 70 formed of any suitable material; for example Bakelite. The conductor from the electrical system of the vehicle may be fixed to the terminal on the base by means of a screw 72.

The exposed portion of the frame may be plated with a material such as chromium which forms a bright, ornamental surface. If desired, the outer portion or head of the T of the frame may be formed with longitudinally extending grooves 74 which assist in forming a fender lamp of pleasing appearance. The entire lamp is substantially streamlined and the lens, cover plate and upper portion of the base form a generally torpedo-shaped structure.

It will be seen that the lamp of this invention is of simple construction and one in which the several parts may be readily manufactured and assembled. The lens may be readily removed by first removing the frame and lens and then rotating the lens until the slot 40 on the flange thereof is in alignment with the lug 14 formed on the annular portion of the frame, whereupon the lens may be withdrawn from the annular portion of the frame. It will be understood, of course, that the slot is of a width sufficient to permit the lug 14 to pass therethrough. In order to remove a bulb it is only necessary to remove the cover plate and lift up on the tab portion 62 and remove the washer-like member 60, whereupon the bulb and socket may be withdrawn from the lens.

While the invention has been described in connection with a vehicle fender lamp, it will be understood that the invention may be used in lamps of any kind. Various changes and modifications may be made in the embodiment of our invention shown and described without departing from the spirit of our invention and we do not wish to limit the patent granted thereon except as defined in the claims when construed by the prior art.

We claim:

1. In a lamp construction, a base, a frame secured thereto and having an annulus at the front thereof, a lens having a portion within the annulus, a lug formed on said annulus and securing the lens thereto, a light source, a cover plate of curved shape, the edges of which contact the frame and means for removably securing the cover plate in position on the frame.

2. In a lamp construction, an elongated base, an elongated frame secured thereto, said frame having an annulus at the front thereof, a hollow generally bullet-shaped lens having the base thereof within the annulus, means for securing the lens in position, a cover plate resting on said frame, and means for removably securing the cover plate in position, the lens, cover plate and upper portion of the base forming a generally torpedo-shaped body.

3. In a fender lamp, an elongated base portion shaped to conform to the curvature of the fender, an elongated frame secured to the top of said base and having the same general outline as the top of the base, said frame having an annular portion at the front thereof of angular cross section, a hollow lens of substantially bullet-shaped contour, means for removably securing the lens to the annular portion of the frame, a light source, resiliently mounted means for securing the light source in position, a cover plate, one end of which contacts the upper part of the annular portion, and means for removably securing the cover plate to the frame, said lens, cover plate and upper portion of the base forming a generally torpedo-shaped structure.

4. In a lamp construction, a base, a frame secured thereto having a portion conforming to the top of the base and having an annular portion of angular cross section, a lens secured to the annular portion, a light source and a cover plate secured to the frame; said frame having the portion conforming to the top of the base of T-shape with the base and cover plate contacting opposite sides of the leg of the T and the head of the T concealing the adjacent edges of the cover plate and top of the base.

5. A lamp construction as set forth in claim 4 in which the lens, base and cover plate form a generally streamlined structure.

HOWARD C. MEAD.
ROBERT D. WINKELMEYER.